United States Patent
Campbell et al.

(10) Patent No.: US 10,255,365 B2
(45) Date of Patent: Apr. 9, 2019

(54) PRIMING SEARCH RESULTS ON ONLINE SOCIAL NETWORKS

(71) Applicant: Facebook, Inc., Menlo Park, CA (US)

(72) Inventors: Craig S. Campbell, Redwood City, CA (US); Guarav Kulkarni, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 447 days.

(21) Appl. No.: 14/473,123

(22) Filed: Aug. 29, 2014

(65) Prior Publication Data

US 2016/0063118 A1  Mar. 3, 2016

(51) Int. Cl.
*G06F 17/30* (2006.01)
*G06Q 50/00* (2012.01)

(52) U.S. Cl.
CPC .... *G06F 17/30867* (2013.01); *G06F 17/3064* (2013.01); *G06F 17/30637* (2013.01); *G06F 17/30902* (2013.01); *G06Q 50/01* (2013.01)

(58) Field of Classification Search
CPC ......... G06F 17/30286; G06F 17/30958; G06F 17/3053; G06F 17/30528; G06F 17/30867
See application file for complete search history.

(56) References Cited

U.S. PATENT DOCUMENTS

| | | | |
|---|---|---|---|
| 6,539,232 B2 | 3/2003 | Hendrey | |
| 6,957,184 B2 | 10/2005 | Schmid | |
| 7,069,308 B2 | 6/2006 | Abrams | |
| 7,539,697 B1 | 5/2009 | Akella | |
| 7,752,326 B2 | 7/2010 | Smit | |
| 7,836,044 B2 | 11/2010 | Kamvar | |
| 8,027,990 B1 | 9/2011 | Mysen | |
| 8,060,639 B2 | 11/2011 | Smit | |
| 8,112,529 B2 | 2/2012 | Van Den Oord | |
| 8,180,804 B1 | 5/2012 | Narayanan | |
| 8,185,558 B1 | 5/2012 | Narayanan | |
| 8,239,364 B2 | 8/2012 | Wable | |
| 8,244,848 B1 | 8/2012 | Narayanan | |
| 8,271,471 B1 | 9/2012 | Kamvar | |
| 8,271,546 B2 | 9/2012 | Gibbs | |
| 8,301,639 B1 | 10/2012 | Myllymaki | |
| 8,321,364 B1 | 11/2012 | Gharpure | |
| 8,364,709 B1 | 1/2013 | Das | |
| 8,386,465 B2 | 2/2013 | Ansari | |
| 8,407,200 B2 | 3/2013 | Wable | |

(Continued)

*Primary Examiner* — Mariela Reyes
*Assistant Examiner* — Courtney Harmon
(74) *Attorney, Agent, or Firm* — Baker Botts L.L.P.

(57) ABSTRACT

In one embodiment, a method includes receiving from a client device of a first user of an online social network a partial query input including a first character string. The method may determine one or more predicted queries based on the partial query input. The method may generate one or more search results for each of the predicted queries. The method may send, in response to receiving the partial query input, one or more of the search results to the client device for storage in a cache of the client device. The method may also retrieve, in response to receiving a completed query input from the first user, one or more of the search results from the cache of the client device for display. The completed query input may include a second character string, where the second character string may include at least the first character string.

33 Claims, 9 Drawing Sheets

(56) References Cited

U.S. PATENT DOCUMENTS

| | | |
|---|---|---|
| 8,412,749 B2 | 4/2013 | Fortuna |
| 8,538,960 B2 | 9/2013 | Wong |
| 8,572,129 B1 | 10/2013 | Lee |
| 8,595,297 B2 | 11/2013 | Marcucci |
| 8,601,027 B2 | 12/2013 | Behforooz |
| 8,732,208 B2 | 5/2014 | Lee |
| 8,751,521 B2 | 6/2014 | Lee |
| 8,782,080 B2 | 7/2014 | Lee |
| 9,361,406 B1* | 6/2016 | Taropa ............... G06F 17/3064 |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0255237 A1 | 12/2004 | Tong |
| 2005/0131872 A1 | 6/2005 | Calbucci |
| 2005/0171955 A1 | 8/2005 | Hull |
| 2006/0136419 A1 | 6/2006 | Brydon |
| 2007/0094042 A1* | 4/2007 | Ramer ............... G06F 17/30867 705/1.1 |
| 2007/0277100 A1 | 11/2007 | Sheha |
| 2008/0072180 A1 | 3/2008 | Chevalier |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0281988 A1 | 11/2009 | Yoo |
| 2009/0299963 A1 | 12/2009 | Pippori |
| 2010/0049802 A1 | 2/2010 | Raman |
| 2010/0228744 A1 | 9/2010 | Craswell |
| 2010/0235354 A1 | 9/2010 | Gargaro |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1* | 6/2011 | Wable ............... G06F 17/30867 707/737 |
| 2011/0191371 A1 | 8/2011 | Elliott |
| 2011/0196855 A1 | 8/2011 | Wable |
| 2011/0276396 A1 | 11/2011 | Rathod |
| 2011/0313992 A1 | 12/2011 | Groeneveld |
| 2012/0059708 A1 | 3/2012 | Galas |
| 2012/0136852 A1 | 5/2012 | Geller |
| 2012/0166432 A1 | 6/2012 | Tseng |
| 2012/0179637 A1 | 7/2012 | Juan |
| 2012/0185486 A1 | 7/2012 | Voigt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0311034 A1 | 12/2012 | Goldband |
| 2013/0031106 A1* | 1/2013 | Schechter ........... G06F 17/3064 707/749 |
| 2013/0041876 A1 | 2/2013 | Dow |
| 2013/0066876 A1 | 3/2013 | Raskino |
| 2013/0086057 A1 | 4/2013 | Harrington |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0226918 A1 | 8/2013 | Berkhim |
| 2013/0246404 A1* | 9/2013 | Annau ............... G06F 17/30672 707/723 |
| 2015/0205833 A1* | 7/2015 | Choc ............... G06F 17/30899 707/767 |

* cited by examiner

PRIMING SEARCH RESULTS ON ONLINE SOCIAL NETWORKS

TECHNICAL FIELD

This disclosure generally relates to social graphs and performing searches for objects within a social-networking environment or related environments.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual users within the networks, and edges represent the relationships between the users. The resulting graph-based structures are often very complex. In its simplest form, a social graph is a map of all of the relevant edges between all the nodes being studied.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area network (WLAN) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a social-networking system may generate structured queries that include references to particular social-graph elements. These structured queries may be generated, for example, in response to a text query provided by a user, or generated as default queries. By providing suggested structured queries to a user's text query, the social-networking system may provide a powerful way for users of an online social network to search for elements represented in a social graph based on their social-graph attributes and their relation to various social-graph elements.

In particular embodiments, a suggested search query may correspond to the user's text query with one or more auto-populated search terms and may take the form of an unstructured text query. The social-networking system may then search data store (or, in particular, a social-graph database) to identify content that matches the suggested query. The search engine may conduct a search based on the suggested query phrase using various search algorithms and generate search results that identify resources or content (e.g., user-profile pages, content-profile pages, or external resources) that are most likely to be related to the suggested search query. In response, the search engine may identify one or more resources that are likely to be related to the suggested query. The identified content may include, for example, social-graph elements, profile pages, external webpages, or any combination thereof. Identified objects may then be generated as search results, where each search result comprises a reference to an identified object.

In particular embodiments, the social-networking system may anticipate a user's query as the user is typing or otherwise inputting the query, and in response, pre-generate search results corresponding to the anticipated query and cache the search results corresponding to the anticipated query. By anticipating the query a user is about to enter and requesting search results in advance, the social-networking system may significantly speed up the search-query process. For example, the social-networking system may receive from a client device of the user of the online social network associated with the social-networking system a partial query input comprising a first character string. The social-networking system may then determine one or more predicted queries based on the partial query input. The social-networking system may generate one or more search results for each of the predicted queries (which may be generated in response to particular priming requests associates with the predicted queries), where the search results correspond to the predicted query. The social-networking system may send one or more of the search results to the client device of the user for storage in a cache of the client device. These search results may then be retrieved from the cache of the client device for display in response to receiving a completed query input at the client device of the user. The anticipation of the user's query and the caching of the search results may be particularly useful in the mobile context, where sending search results may be slow. Furthermore, similar functionality anticipating user actions and pre-generating content may be used in other contexts of the online social network, such as for pre-generating content in response to a user posts, comments, check-ins, sharing, log-in events, or other suitable actions.

In particular embodiments, as the user is entering characters in a query field, the social-networking system may generate one or more predicted queries. The social-networking system may determine whether to pre-generate search results (for example, by sending a priming request) for one or more of the predicted queries based on a variety of factors. For example, the social-networking system may not execute one or more predicted queries until the user has entered in a threshold number of characters in the query field. Upon the execution of the predicted queries, the social-networking system may send one or more of the search results associated with the executed predicted queries to the client device of the user for storage in a cache of the client device. If the user inputs a query substantially matching one of the predicted queries, the client device may retrieve the search results corresponding to the selected query immediately from the cache client's cache. In contrast, if the user inputs a query that does not substantially match at least one of the predicted queries, the social-networking system may have to generate new search results corresponding to the completed query input for display to the first user at the user's client device.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
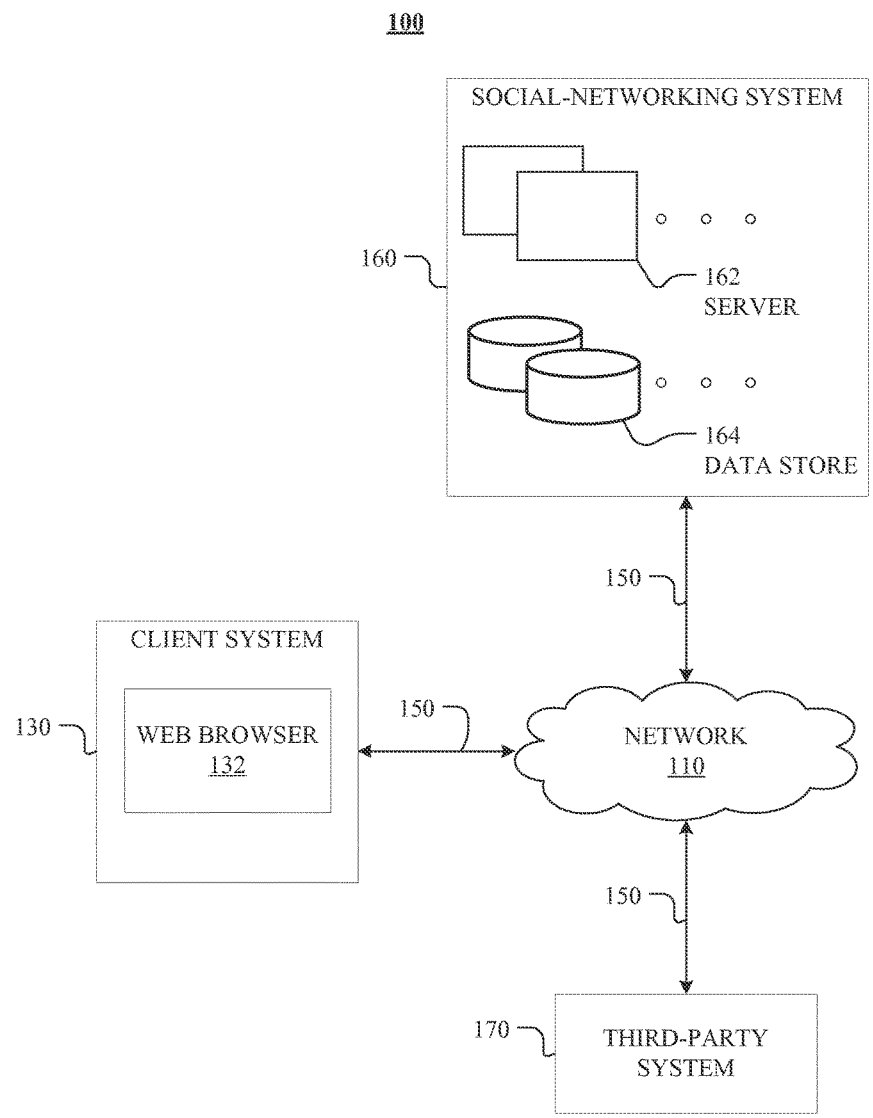
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable page files, including webpages or pages presented as a user interface of a native application. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational database. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Ad-pricing modules may combine social information, the current time, location information, or other suitable information to provide relevant advertisements, in the form of notifications, to a user.

Social Graphs

Figure 2:
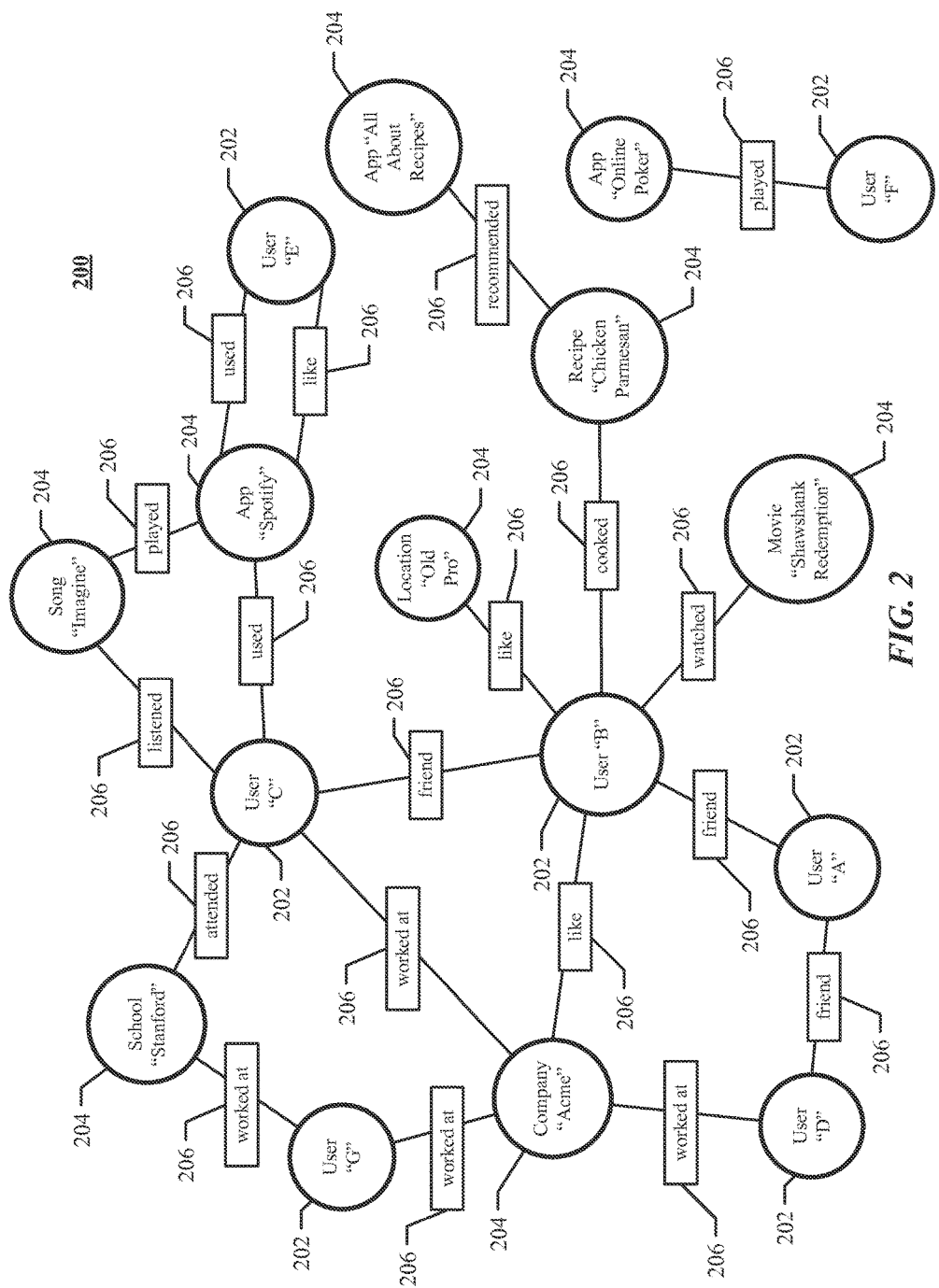
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more pages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-networking system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more pages.

In particular embodiments, a node in social graph 200 may represent or be represented by a page (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP code) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Mobile Client Systems

Figure 3:
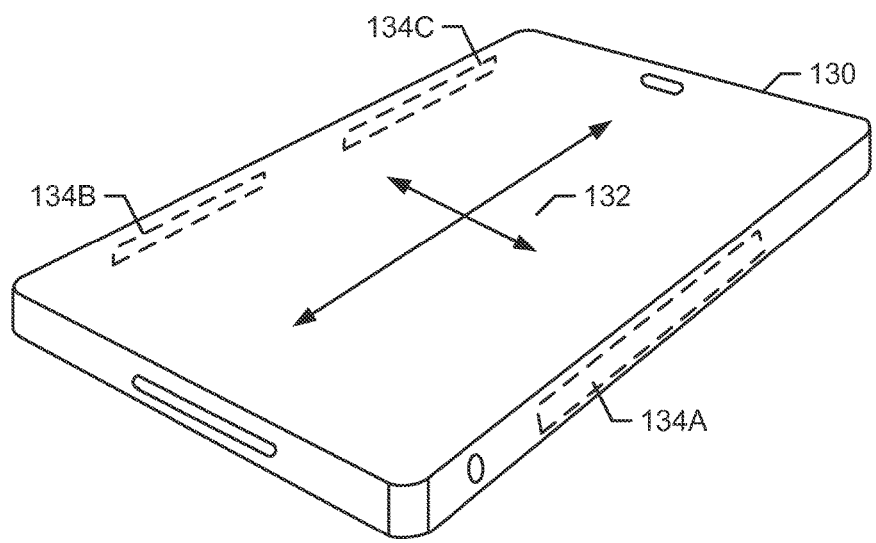
FIG. 3 illustrates an example mobile client system.

FIG. 3 illustrates an example mobile client system 130. This disclosure contemplates mobile client system 130 taking any suitable physical form. In particular embodiments, mobile client system 130 may be a computing system as described below. As example and not by way of limitation, mobile client system 130 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile client system 130 may have a touch sensor 132 as an input component. In the example of FIG. 3, touch sensor 132 is incorporated on a front surface of mobile client system 130. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 3, one or more antennae 134A-C may be incorporated into one or more sides of mobile client system 130. Antennae 134A-C are components that convert electric current into radio waves, and vice versa. During transmission of signals, a transmitter applies an oscillating radio frequency (RF) electric current to terminals of antenna 134A-C, and antenna 134A-C radiates the energy of the applied the current as electromagnetic (EM) waves. During reception of signals, antennae 134A-C convert the power of an incoming EM wave into a voltage at the terminals of antennae 134A-C. The voltage may be transmitted to a receiver for amplification.

In particular embodiments, mobile client system 130 many include a communication component coupled to antennae 134A-C for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component 20 for it. As an example and not by way of limitation, mobile client system 130 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile client system 130 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile client system 130 may include any suitable communication component for any of these networks, where appropriate.

In particular embodiments, the communication component coupled to antennae 134A-C mobile client system 130 may determine location data based on global positioning system (GPS) signals, cellular triangulation, wireless hotspots, Bluetooth beacons, or any suitable methods for determining location data. In particular embodiments, the location service of mobile client system 130 may use one or more methods of location determination, such as for example, using the location of one or more cellular towers, crowd-sourced location information associated with a WI-FI hotspot, or a GPS function of mobile client system 130. As an example and not by way of limitation, the application may use GPS data as the primary source of location information depending at least in part on whether mobile client system 130 is able to acquire GPS data within a pre-determined period of time. As another example, if mobile client system 130 is unable to acquire the GPS data within the pre-determined sampling duration, the application may use the location determined using one or more cellular towers or WI-FI hotspots. Although this disclosure describes particular location service using particular methods of location determination, this disclosure contemplates any suitable location service using any suitable method or combination of methods of location detection. In connection with determining a user's location, particular embodiments may utilize one or more systems, components, elements, functions, methods, operations, or steps disclosed in U.S. patent application Ser. No. 13/930,321, filed 28 Jun. 2013 and U.S. patent application Ser. No. 13/930,347, filed 28 Jun. 2013 which are incorporated by reference.

Typeahead Processes

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested page (such as, for example, a user-profile page, a concept-profile page, a search-results page, a user interface of a native application associated with the online social network, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to user, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element.

In particular embodiments, as a user types or otherwise enters text into a form used to add content or make declarations in various sections of the user's profile page, home page, or other page, the typeahead process may work in conjunction with one or more frontend (client-side) and/or backend (server-side) typeahead processes (hereinafter referred to simply as "typeahead process") executing at (or within) the social-networking system 160 (e.g., within servers 162), to interactively and virtually instantaneously (as appearing to the user) attempt to auto-populate the form with a term or terms corresponding to names of existing social-graph elements, or terms associated with existing social-graph elements, determined to be the most relevant or best match to the characters of text entered by the user as the user enters the characters of text. Utilizing the social-graph information in a social-graph database or information extracted and indexed from the social-graph database, including information associated with nodes and edges, the typeahead processes, in conjunction with the information from the social-graph database, as well as potentially in conjunction with various others processes, applications, or databases located within or executing within social-networking system 160, may be able to predict a user's intended declaration with a high degree of precision. However, the social-networking system 160 can also provide users with the freedom to enter essentially any declaration they wish, enabling users to express themselves freely.

In particular embodiments, as a user enters text characters into a form box or other field, the typeahead processes may attempt to identify existing social-graph elements (e.g., user nodes 202, concept nodes 204, or edges 206) that match the string of characters entered in the user's declaration as the user is entering the characters. In particular embodiments, as the user enters characters into a form box, the typeahead process may read the string of entered textual characters. As each keystroke is made, the frontend-typeahead process may send the entered character string as a request (or call) to the backend-typeahead process executing within social-networking system 160. In particular embodiments, the typeahead processes may communicate via AJAX (Asynchronous JavaScript and XML) or other suitable techniques, and particularly, asynchronous techniques. In particular embodiments, the request may be, or comprise, an XMLHTTPRequest (XHR) enabling quick and dynamic sending and fetching of results. In particular embodiments, the typeahead process may also send before, after, or with the request a section identifier (section ID) that identifies the particular section of the particular page in which the user is making the declaration. In particular embodiments, a user ID parameter may also be sent, but this may be unnecessary in some embodiments, as the user may already be "known" based on the user having logged into (or otherwise been authenticated by) the social-networking system 160.

In particular embodiments, the typeahead process may use one or more matching algorithms to attempt to identify matching social-graph elements. In particular embodiments, when a match or matches are found, the typeahead process may send a response (which may utilize AJAX or other suitable techniques) to the user's client system 130 that may include, for example, the names (name strings) or descriptions of the matching social-graph elements as well as, potentially, other metadata associated with the matching social-graph elements. As an example and not by way of limitation, if a user entering the characters "pok" into a query field, the typeahead process may display a drop-down menu that displays names of matching existing profile pages and respective user nodes 202 or concept nodes 204, such as a profile page named or devoted to "poker" or "pokemon", which the user can then click on or otherwise select thereby confirming the desire to declare the matched user or concept name corresponding to the selected node. As another example and not by way of limitation, upon clicking "poker," the typeahead process may auto-populate, or causes the web browser 132 to auto-populate, the query field with the declaration "poker". In particular embodiments, the typeahead process may simply auto-populate the field with the name or other identifier of the top-ranked match rather than display a drop-down menu. The user may then confirm the auto-populated declaration simply by keying "enter" on his or her keyboard or by clicking on the auto-populated declaration.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

Searching an Online Social Network

In particular embodiments, a user may submit a query to the social-networking system 160 by inputting text into a query field. A user of an online social network may search for information relating to a specific subject matter (e.g., users, concepts, external content or resources) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify content objects (e.g., user-profile pages, concept-profile pages, multimedia objects, external content objects, or other suitable resources) that are most likely to be related to the search query. To conduct a search, a user may input or send a search query to the search engine. In response, the search engine may identify one or more content objects that match or satisfy the search query, or are otherwise related to the search query. Social-networking system 160 may then generate one or more search results corresponding to the identified content objects. The identified content may include, for example, social-graph elements (i.e., user nodes 202, concept nodes 204, edges 206), profile pages, external webpages, or any combination thereof. The social-networking system 160 may then generate a search-results page with search results corresponding to the identified content and send the search-results page to the user. The search results may be sent to the client system 130 of the user for display, for example, in the form of a list of links on the search-results page, each link being associated with a different page that contains some of the identified content objects or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on or otherwise select the links or otherwise select the content from the search-results page to access the content from the social-networking system 160 or from an external system (such as, for example, a third-party system 170), as appropriate. The content objects may be ranked and presented to the user in a variety of ways, for example, according to their relative degrees of relevance to the search query. The search results may also be ranked and presented to the user according to their relative degree of relevance to the user. In other words, the search results may be personalized for the querying user based on, for example, social-graph information, user information, search or browsing history of the user, advertising sponsorship, other suitable information related to the user, or any combination thereof. In particular embodiments, ranking of the content objects may be determined by one or more ranking algorithms implemented by the search engine. As an example and not by way of limitation, content objects that are more relevant to the search query or to the user may be ranked higher by the ranking algorithm(s) than the content objects that are less relevant to the search query or the user. In particular embodiments, the search engine may limit its search to content objects and content on the online social network. However, in particular embodiments, the search engine may also search for content objects or contents on other sources, such as a third-party system 170, the internet or World Wide Web, or other suitable sources. In connection with searching third-party systems, particular embodiments may utilize one or more systems, components, elements, functions, methods, operations, or steps disclosed in U.S. patent application Ser. No. 14/341,148, filed 25 Jul. 2014, which is incorporated by reference. Although this disclosure describes querying the social-networking system 160 in a particular manner, this disclosure contemplates querying the social-networking system 160 in any suitable manner.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into query field as the user is entering the characters. As the typeahead process receives requests or calls including a string or n-gram from the text query, the typeahead process may perform or causes to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Search Queries and Search Clients

In particular embodiments, social-networking system 160 may receive from a querying/first user (corresponding to a first user node 202) a search query. The user interface (UI) of a client system 130 may include a query field configured to receive the search query from the querying user. In particular embodiments, the UI may be provided by a native application associated with the online social network or by a webpage of the social-networking system 160 accessed by a browser client 132. The search query may be a text query, and may comprise one or more character strings, which may include one or more n-grams as described below. A user may input a character string comprising one or more characters into a query field to search for objects in social-networking system 160 that substantially match the character string. The search query may also be a structured query comprising references to particular nodes or edges from social graph 200. The structured queries may be based on the natural-language strings generated by one or more grammars, as described in U.S. patent application Ser. No. 13/674,695, filed 12 Nov. 2012, and U.S. patent application Ser. No. 13/731,866, filed 31 Dec. 2012, each of which is incorporated by reference. As an example and not by way of limitation, the search query "Friends of Stephanie" may be a structured query, where "Friends" and "Stephanie" in the search query are references corresponding to particular social-graph elements. The reference to "Stephanie" corresponds to a particular user node 202 (where social-networking system 160 has parsed the n-gram "my girlfriend" to correspond with a user node 202 for the user "Stephanie"), while the reference to "Friends" corresponds to friend-type edges 206 connecting that user node 202 to other user nodes 202 (i.e., edges 206 connecting to "Stephanie's" first-degree friends). The search query may be received in any suitable manner, such as, for example, when the user inputs the search query into a query field on a webpage of the online social network, or into a native application associated with the online social network.

In particular embodiments, social-networking system 160 may receive from a querying/first user (corresponding to a first user node 202) an unstructured text query. As an example and not by way of limitation, a first user may want to search for other users who: (1) are first-degree friends of the first user; and (2) are associated with Stanford University (i.e., the user nodes 202 are connected by an edge 206 to the concept node 204 corresponding to the school "Stanford"). The first user may then enter a text query "friends stanford" into a query field. As the querying user enters this text query into query field, social-networking system 160 may provide various suggested structured queries and/or typeahead suggestions for matching entries, as illustrated in a drop-down menu. As used herein, an unstructured text query refers to a simple text string inputted by a user. The text query may, of course, be structured with respect to standard language/grammar rules (e.g. English language grammar). However, the text query will ordinarily be unstructured with respect to social-graph elements. In other words, a simple text query does not ordinarily include embedded references to particular social-graph elements. Thus, as used herein, a structured query refers to a query that contains references to particular social-graph elements, allowing the search engine to search based on the identified elements. Furthermore, the text query may be unstructured with respect to formal query syntax. In other words, a simple text query is not necessarily in the format of a query command that is directly executable by a search engine. For example, the text query "friends stanford" could be parsed to form the query command "intersect (school(Stanford University), friends(me))", which could be executed as a query in a social-graph database. As the querying user enters text query into the query field, social-networking system 160 may provide typeahead suggestions for matching entries, e.g., a user "Freddie Rumsfeld," for a user matching the typed prefix "fr" in addition to the suggested structured queries. Although this disclosure describes receiving particular queries in a particular manner, this disclosure contemplates receiving any suitable queries in any suitable manner. More information on search queries may be found in U.S. patent application Ser. No. 13/556,060, filed 23 Jul. 2012, and U.S. patent application Ser. No. 13/732,175, filed 31 Dec. 2012, each of which is incorporated by reference.

In particular embodiments, social-networking system 160 may parse the search query received from the first user (i.e., the querying user) to identify one or more n-grams. In general, an n-gram is a contiguous sequence of n items from a given sequence of text or speech. The items may be characters, phonemes, syllables, letters, words, base pairs, prefixes, or other identifiable items from the sequence of text or speech. The n-gram may comprise one or more characters of text (letters, numbers, punctuation, etc.) entered by the querying user. An n-gram of size one can be referred to as a "unigram," of size two can be referred to as a "bigram" or "digram," of size three can be referred to as a "trigram," and so on. Each n-gram may include one or more parts from the search query received from the querying user. In particular embodiments, each n-gram may comprise a character string (e.g., one or more characters of text) entered by the first user. As an example and not by way of limitation, social-networking system 160 may parse the search query "all about recipes" to identify the following n-grams: all; about; recipes; all about; about recipes; all about recipes. In particular embodiments, each n-gram may comprise a contiguous sequence of n items from the search query. Although this disclosure describes parsing particular queries in a particular manner, this disclosure contemplates parsing any suitable queries in any suitable manner. In connection with element detection and parsing search queries, particular embodiments may utilize one or more systems, components, elements, functions, methods, operations, or steps disclosed in U.S. patent application Ser. No. 13/556,072, filed 23 Jul. 2012, U.S. patent application Ser. No. 13/732,101, filed 31 Dec. 2012, each of which is incorporated by reference.

In particular embodiments, a suggested search query may correspond to a phrase with one or more auto-populated search terms and may take the form of an unstructured text query. Social-networking system 160 may then search data store 164 (or, in particular, a social-graph database) to identify content that matches the suggested query. The search engine may conduct a search based on the suggested query phrase using various search algorithms and generate search results that identify resources or content (e.g., user-profile pages, content-profile pages, or external resources) that are most likely to be related to the suggested search query. In response, the search engine may identify one or more resources that are likely to be related to the suggested query. The identified content may include, for example, social-graph elements (e.g., user nodes 202 or concept nodes 204), profile pages, external webpages, or any combination thereof. Identified objects may then be generated as search results, where each search result comprises a reference to an identified object. The search results may then be sent to client system 130 of the querying user for display (e.g., as part of a search-results page comprising references to one or more of the identified objects). In particular embodiments, social-networking system 160 may generate a suggested query for a user as one or more structured queries. The suggested queries may be personalized recommendations of objects that correspond to particular nodes of social graph 200. Herein, reference to a suggested query may refer to a search query with one or more search terms auto-populated with information.

Generating Search Results

In particular embodiments, in response to a query received from a querying user, social-networking system 160 may generate one or more search results, where the search results correspond to the query. Social-networking system 160 may identify objects (e.g., users, photos, profile pages (or content of profile pages), etc.) that satisfy or otherwise match the query. Each search result may correspond to a node of social graph 200. A search result corresponding to each identified object may then be generated. As an example and not by way of limitation, in response to the query "Photos of Matt and Stephanie", social-networking system 160 may identify a photo where the user's "Matt" and "Stephanie" are both tagged in the photo. A search result corresponding to this photo may then be generated and sent to the user. In particular embodiments, each search result may be associated with one or more objects, where each query constraint of the query command corresponding to the query is satisfied by one or more of the objects associated with that particular search result. As an example and not by way of limitation, continuing with the prior example, in response to the structured query "Photos of Matt and Stephanie", social-networking system 160 may parse the query to generate the query command (intersect (photos_of:<Matt>), (photos_of:<Stephanie>)), which could be executed to generate a search result corresponding to a photo where the user's "Matt" and "Stephanie" (who were both referenced in the structured query) are both tagged in the photo (i.e., their user nodes 202 are connected by tagged-in-type edges 206 to the concept node 204 corresponding to the photo). In other words, the constraints for (photos_of:<Matt>) and (photos_of:<Stephanie>) are both satisfied by the photo because it is connected to the user nodes 202 for the user's "Matt" and "Stephanie". The nodes identified as matching the query may be scored (and possibly ranked), and then one or more (e.g., a threshold number) may be generated as search result to display to the user. Although this disclosure describes generating search results in a particular manner, this disclosure contemplates generating search results in any suitable manner.

In particular embodiments, social-networking system 160 may send one or more search results to the querying user. The search results may be sent to the user, for example, in the form of a list of links on the search-results page, each link being associated with a different page that contains some of the identified resources or content. In particular embodiments, each link in the search results may be in the form of a Uniform Resource Locator (URL) that specifies where the corresponding webpage is located and the mechanism for retrieving it. Social-networking system 160 may then send the search-results page to the browser client 132 on the user's client system 130 for display to the querying user. The user may then click on the URL links or otherwise select the content from the search-results page to access the content from social-networking system 160 or from an external system (such as, for example, third-party system 170), as appropriate. In particular embodiments, each search result may include link to a profile page and a description or summary of the profile page (or the node corresponding to that page). When generating the search results, social-networking system 160 may generate one or more snippets for each search result, where the snippets are contextual information about the target of the search result (i.e., contextual information about the social-graph entity, profile page, or other content corresponding to the particular search result). In particular embodiments, social-networking system 160 may only send search results having a score/rank over a particular threshold score/rank. As an example and not by way of limitation, social-networking system 160 may only send the top ten results back to the querying user in response to a particular search query. Although this disclosure describes sending particular search results in a particular manner, this disclosure contemplates sending any suitable search results in any suitable manner.

More information on generating search results and snippets may be found in U.S. patent application Ser. No. 13/731,939, filed 31 Dec. 2012, which is incorporated by reference.

Priming Search Results

In particular embodiments, in order to accelerate the delivery of search results to a user operating a client system 130, social-networking system 160 may "prime" the search results associated with one or more predicted search queries. The accelerated delivery of search results may be particularly useful, for example, in the mobile context (i.e. client system 130 is a mobile client system such as for example, a smart phone, a mobile laptop, or tablet), where sending search results from social-networking system 160 (or any other suitable backend servers) to mobile client system 130 in response to a user's query may be slow, for example, due to bandwidth limitations. As the user inputs a character string into a query field, social-networking system 160 may generate a plurality of predicted search queries substantially matching the search query request in real-time as the user is still inputting characters. As an example and not by way of limitation, if a user has inputted the character string "stanford u" into the query field, social-networking system 160 may generate a predicted search query for "Stanford University." Social-networking system 160 may anticipate, from the character string currently inputted by the user, one or more predicted queries that may be selected by the user, and send priming requests corresponding to one or more of the predicted queries to a query server (for example, search-engine server 162B) to retrieve one or more search results matching the queries. The priming request may be a particular request sent to a query server, or may simply be another type of call to the query server (e.g., a call to a frontend and/or backend typeahead process), which social-networking system 160 determines to execute as a priming request. In particular embodiments, these search results may be sent, by social-networking system 160, to client system 130 for storage in a cache (for example, cache 402) of client system 130. In other words, social-networking system 160 may generate search results corresponding to one or more of these predicted search queries before the user completes inputting a query, and then send the search results to the user's client system 130 to be cached. These search results may be generated and sent in response to a priming request, which may be sent from client system 130, or determined by social-networking system 160. As such, the search results may be retrieved from social-networking system 160 and loaded into the cache of client system 130 before the user has even entered the query completely. In other words, before the querying user even completes the query and hits "Search" or otherwise runs the query, social-networking system 160 may generate and send search results to the user's client system 130 in anticipation of the user completing the query input and running the query. Once the querying user completes inputting the query and hits "Search", client system 130 may immediately retrieve the pre-generated search results from a client-side cache for display to the user (for example, assuming the final query inputted by the user actually matches one of the predicted queries that was primed). Because the search results may be retrieved quickly from the cache of client system 130, the priming requests allow the user to experience a near-instantaneous search query functionality. In particular embodiments, the search results generated in response to a priming request may be generated by social-networking system 160 and stored in a cache associated with social-networking system 160, and then sent once the querying user completed inputting the query (e.g., by selecting "Search"). As such, the search results may be generated and stored in a cache of the social-networking system 160 before the user has even entered the query completely. In other words, before the querying user even completes the query and hits "Search" or otherwise runs the query, social-networking system 160 may generate and store search results to a server-side cache in anticipation of the user completing the query input and running the query. Once the querying user completes inputting the query and hits "Search", client system 130 may immediately retrieve the pre-generated search results from a server-side cache for display to the user (for example, assuming the final query inputted by the user actually matches one of the predicted queries that was primed). Because the search results may be retrieved quickly from the cache of social-networking system 160, the priming request may allow the user to experience a quicker search query functionality compared to the scenario where the user has to first wait for the social-networking system 160 to first generate search results. Furthermore, social-networking system 160 may send one or more of the predicted queries, as suggested queries, to client system 130 for display to the user. If the user selects one of the suggested queries, client system 130 may instantaneously send the one or more cached search results associated with the selected suggested query for display to the user. In particular embodiments, if the user inputs a query that does not match one of the predicted queries that was primed (e.g., does not select any of the suggested queries and instead complete a new query), client system 130 may at that point send the search query to social-networking system 160 to retrieve one or more search results corresponding to the new query. In particular embodiments, if the search results corresponding to the user's selected query cannot be found in the cache of the client device, client system 130 may send the selected query to social-networking system 160 to retrieve one or more search results corresponding to the selected query.

Figure 4A:
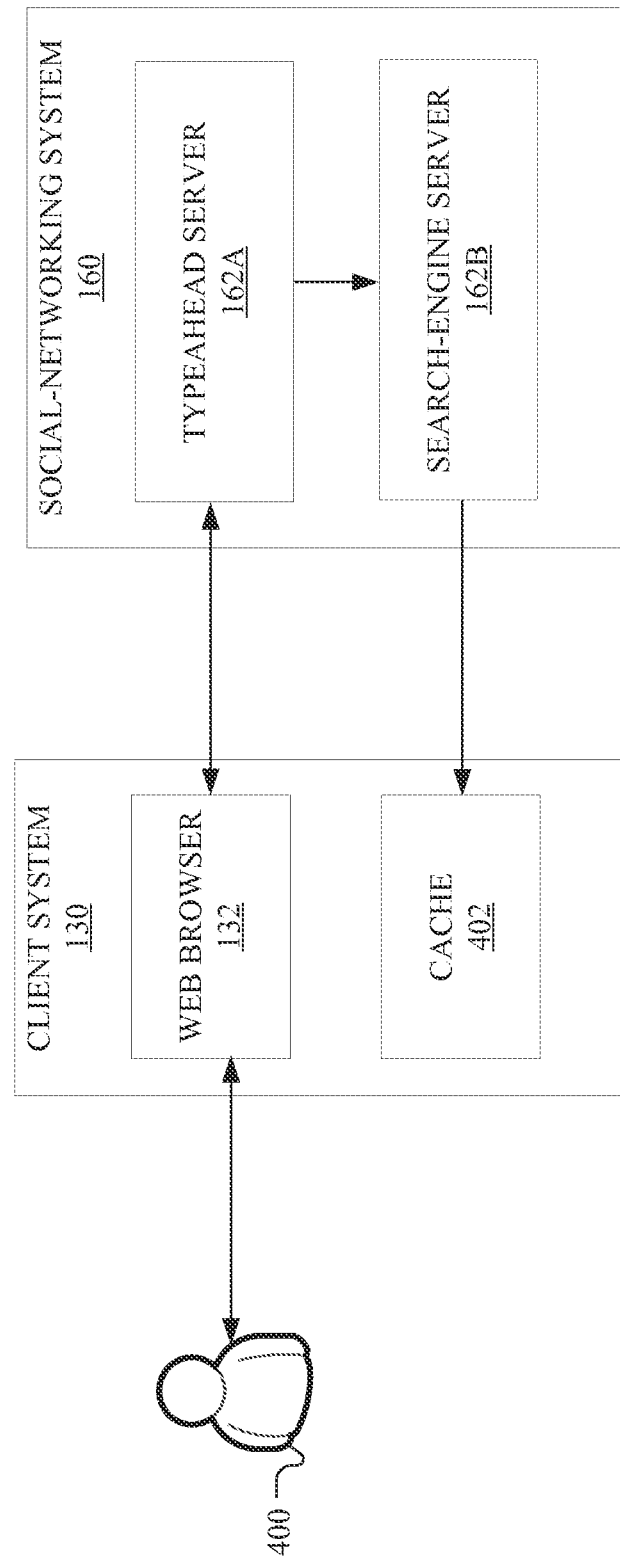
FIG. 4A illustrates the network environment for priming search results.

FIG. 4A illustrates an example network environment for priming search results. In the example of FIG. 4A, the example network environment may be part of network environment 100 of FIG. 1. As such, client system 130 may receive, from user 400 of an online social network, one or more characters as one or more query inputs via web browser 132. In particular embodiments, the one or more characters may comprise a first query input (a.k.a. partial query input) and a second query input (a.k.a. completed query input). As an example and not by way of limitation, the first query input may comprise a first character string of the characters as received from user 400 while the second query input may comprise at least the first character string. Thereof, client system 130 may send the one or more query inputs to typeahead server 162A of social-networking system 160 to determine one or more predicted queries where each predicted query may substantially match one or more of the query inputs, as described above. Although this disclosure describes and illustrates particular web browser of client system 130 for receiving particular query inputs from particular user of the online social network, the disclosure contemplates any suitable component of any suitable client system for receiving any suitable combination of one or more of any suitable query input from any suitable user of any suitable online social network.

In particular embodiments, in response to receiving the query inputs from client system 130, typeahead server 162A may access social-graph 200 to determine one or more predicted search queries corresponding to the query inputs where each query input may substantially match at least one of the predicted queries, as described above. In particular embodiments where the one or more characters comprise a first query input and a second query input as described above, each predicted query may substantially match at least the first character string of the first query. In particular embodiments, at least one of the predicted queries is a structured query comprising references to one or more nodes and one or more edges of social graph 200.

In particular embodiments, typeahead server 162A may decide whether to prime each of the predicted queries before sending the corresponding priming requests to search-engine server 162B. In particular embodiments, typeahead server 162A may send all the predicted queries to search-engine server 162B for priming the predicted queries. In particular embodiments, social-networking system 160 may utilize a predictive model to determine whether to prime a predicted search query request. As an example and not by way of limitation, social-networking system 160 may assign a score for each predicted query where the score may indicate at least a probability or likelihood that the predicted query may be selected by the user. As such, a relative high score may indicate a higher probability or likelihood that the predicted query may be selected by the user. In contrast, a relative low score may cause social-networking system 160 not to prime the predicted query. In particular embodiments, social-networking system 160 may only prime predicted queries whose scores are above a pre-determined threshold.

In particular embodiments, if client system 130 is a mobile client system (as described above), the score may be determined at least by a number of characters in the query input. As an example and not by way of limitation, if the number of characters in the query input is lower than a pre-determined threshold value, social-networking system 160 may assign a relative lower score for a predicted query associated with the query input. In particular embodiments, the relative low score of the predicted query may cause social-networking system 160 not to prime the predicted query. In particular embodiments, the score may be determined at least by a cost of executing the predicted query. In particular embodiments the score may be determined at least by a value of priming the predicted query. In particular embodiments, the score may be determined at least by a ranking determined a typehead process, as described above. As an example and not by way of limitation, the ranking may be determined based at least on the one or more matches between one or more n-grams of the query input and one or more objects (i.e. social-graph elements) associated with social graph 200. In particular embodiments, the score may be determined at least by a query type of the query input. As an example and not by way of limitation, the query type may be determined at least by a content of one or more objects of social graph 200 that substantially match the one or more n-grams of the query input. If the query type is associated with multimedia content such as, for example video clip, photos, or user's profile page on the online social network, a higher score may be determined for the predicted query associated with the query input. In contrast, if the query type is associated with light content such as, for example a text file or a light webpage, a lower score may be determined for the predicted query associated with the query input. In particular embodiments, the score may be determined at least by a page of the online social network currently accessed by the user. As an example and not by way of limitation, if the user currently accessed a profile page of a second user, a higher score may be determined for a predicted query corresponding to photo objects of the second user from social graph 200. In particular embodiments, the score may be determined at least by a social-graph affinity of the user with respect to one or more objects associated with the query input, as described below. Although the disclosure describes particular means of scoring particular predicted query, the disclosure contemplates any suitable means of scoring any suitable predicted query.

In particular embodiments, social-networking system 160 may filter the predicted queries before priming based at least in part on the calculated scores of the predicted queries. As an example and not by way of limitation, social-networking system 160 may only prime predicted queries whose scores are above a pre-determined threshold. As another example and not by way of limitation, social-networking system 160 may automatically prime predicted queries whose scores are above a pre-determined threshold while delay priming predicted queries whose scores are below the pre-determined threshold. Although the disclosure describes particular means of filtering particular predicted queries, the disclosure contemplates any suitable means of filtering any suitable predicted queries.

In particular embodiments, social-networking system 160 may make one or more determinations before social-networking system 160 executes the predicted query to generate one or more search results with names corresponding to matched profile pages and their respective user nodes 202, concept nodes 204, or edges 206. As discusses, in the case that a plurality of predicted queries to existing nodes are identified, social-networking system 160 may then determine a confidence score for each of the predicted query that indicates an absolute or relative quality of each of the names of the matching nodes, the quality of the matching nodes themselves, or otherwise a level of confidence that social-networking system 160 has that the predicted query is correct (the intended predicted query that the user was entering or trying to enter). This determination may also result or involve a ranking of the predicted queries (which may be reflected in the order of the search queries displayed in the drop-down menu associated with the query field).

In particular embodiments, social-networking system 160 may make one or more second determinations before social-networking system 160 executes a predicted query with names corresponding to ranked matched nodes. As an example and not by way of limitation, based on the confidence scores, social-networking system 160 may determine whether there is a determined level of probability, certainty, or confidence (a confidence score) for each predicted query before the predicted query is executed. That is, in particular embodiments, even though one or more predicted queries have been identified from the existing nodes in social graph 200, their respective certainties (in being the actual predicted query the user was intending to declare) as demonstrated by their determined confidence scores may be below a first predetermined threshold, and hence, none of the predicted queries may be executed. That is, rather than executing the predicted query or predicted queries having confidence scores below the threshold, social-networking system 160 may allow the user to finish typing the declaration himself or herself, and then client system 130 may transmit the completed user's declaration to social-networking system 160. Social-networking system 160 may determine the best predicted queries corresponding to the user's completed declaration.

In particular embodiments, if no suitable match is identified to a predetermined level of certainty (e.g., based on comparison of confidence scores with the second threshold), or the user abstains from selecting a provided or auto-populated predicted query, then, as the user continues to enter characters of text in a declaration, social-networking system 160 may wait until the user is finished entering the declaration as, for example, indicated by the user clicking or otherwise selecting the save changes button, before client system 130 transmits the character string, section identifier, or other information/data to social-networking system 160.

In particular embodiments, in response to receiving the priming requests from typeahead server 162A, search-engine server 162B may generate one or more search results corresponding to each of the predicted queries associated with the priming requests. In particular embodiments, as described above, search-engine server 162B may access and search social graph 200 to identify one or more objects corresponding to one or more nodes, respectively, of the plurality of nodes that substantially match each of the predicted queries. Furthermore, each of the search results comprises references to one or more of the identified objects of social graph 200, as described above. Although the disclosure describes and illustrates particular means to generate one or more search results corresponding to each of the predicted queries, the disclosure contemplates any suitable means to generate one or more search results corresponding to each of the predicted queries in any suitable manner.

In particular embodiment, search-engine server 162B may score each search result as described above. In particular embodiments, in response to receiving a priming request associated with one of the predicted queries, search-engine server 162B may send one or more of the scored search results to client system 130 for storage in cache 402 of client system 130. As an example and not by way of limitation, search-engine server 162B may only send to client system 130 search results whose scores are above a pre-determined threshold value. In particular embodiments, in response to receiving a priming request associated with one of the predicted queries, search-engine server 162B may send one or more of the scored search results to server-side cache of social-networking system 160. As an example and not by way of limitation, search-engine server 162B may only send to the server-side cache search results whose scores are above a pre-determined threshold value. As discussed previously, the search results generated in response to a priming request may then be retrieved in response to the querying user completing a query (e.g., by hitting "Search", or clicking/selecting a suggested query). The pre-generated search results may be retrieved from a client-side or server-side cache, as appropriate. Although the disclosure describes caching pre-generated search results in a particular manner, this disclosure contemplates caching pre-generated search results in any suitable manner.

Figure 5A:
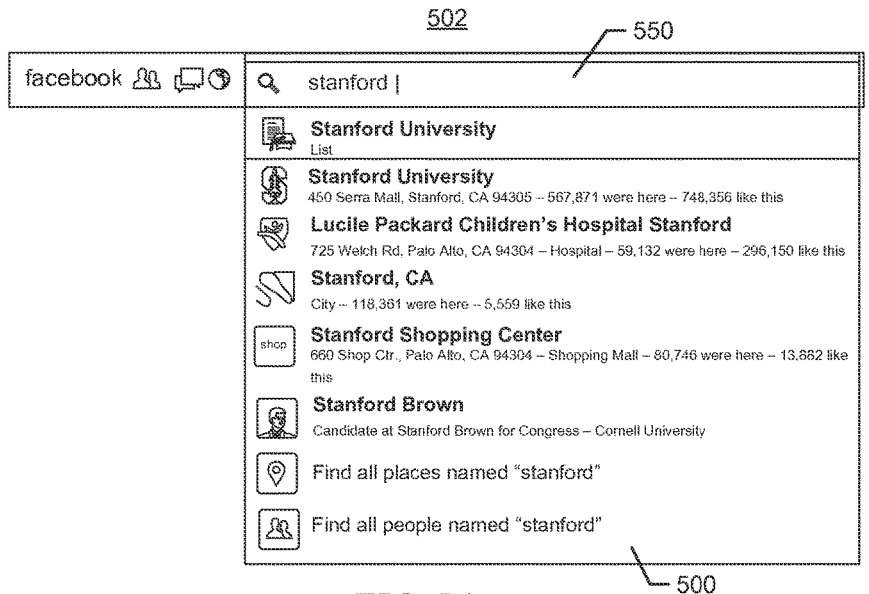
FIG. 5A illustrates an example page comprising a plurality of example suggested queries associated with a first example partial query input.
Figure 5B:
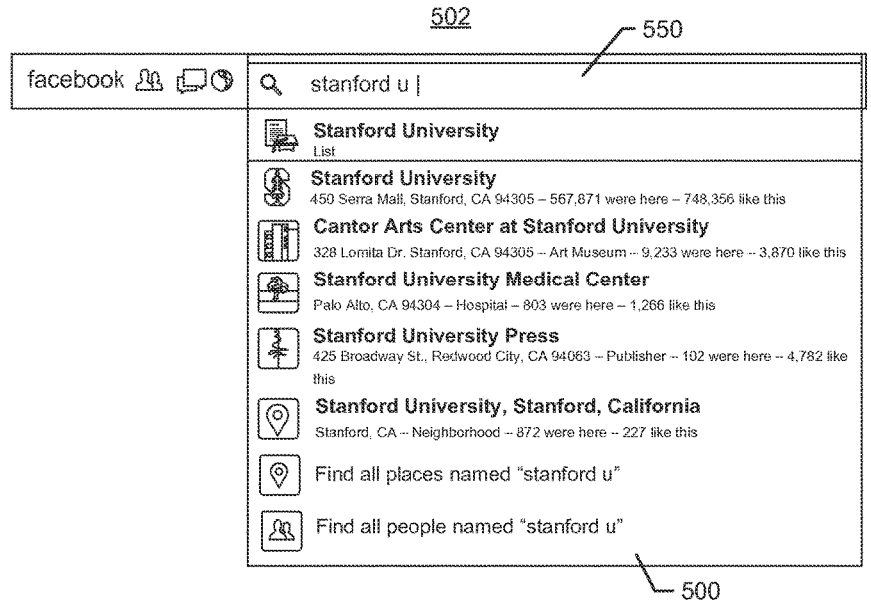
FIG. 5B illustrates an example page comprising a plurality of example suggested queries associated with a second example partial query input.
Figure 5C:
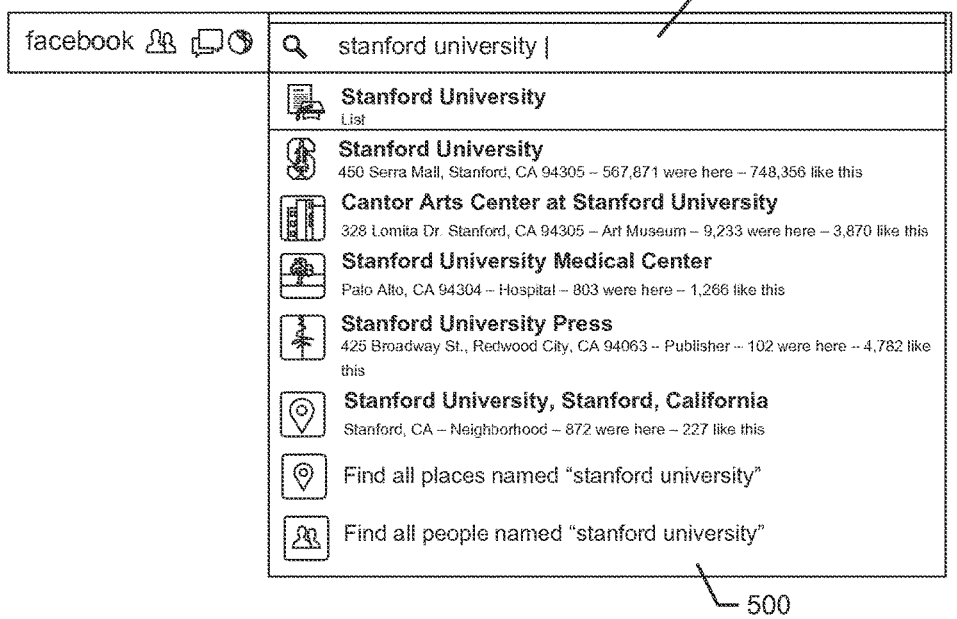
FIG. 5C illustrates an example page comprising a plurality of suggested queries associated with an example completed query input.

In particular embodiments, in response to receiving each of the first and second queries, typeahead server 162A may also send to web browser 132 of client system 130 one or more of the predicted queries (as suggested queries) corresponding to each of the first and second queries. As an example and not by way of limitation, the suggested queries may be display in drop-down menu 500 as illustrated in FIGS. 5A-5C. In particular embodiments, typeahead server 162A may only send to client system 130 suggested queries whose scores are above a pre-determined threshold value.

Although the disclosure describes and illustrates particular components, devices, or systems carrying out particular steps of priming search results, this disclosure contemplates any suitable combination of any suitable components, devices, or systems carrying out any suitable steps of priming search results in any suitable manner or order, including any suitable steps, which may include all, some, or none of the steps of FIG. 4A.

Figure 4B:
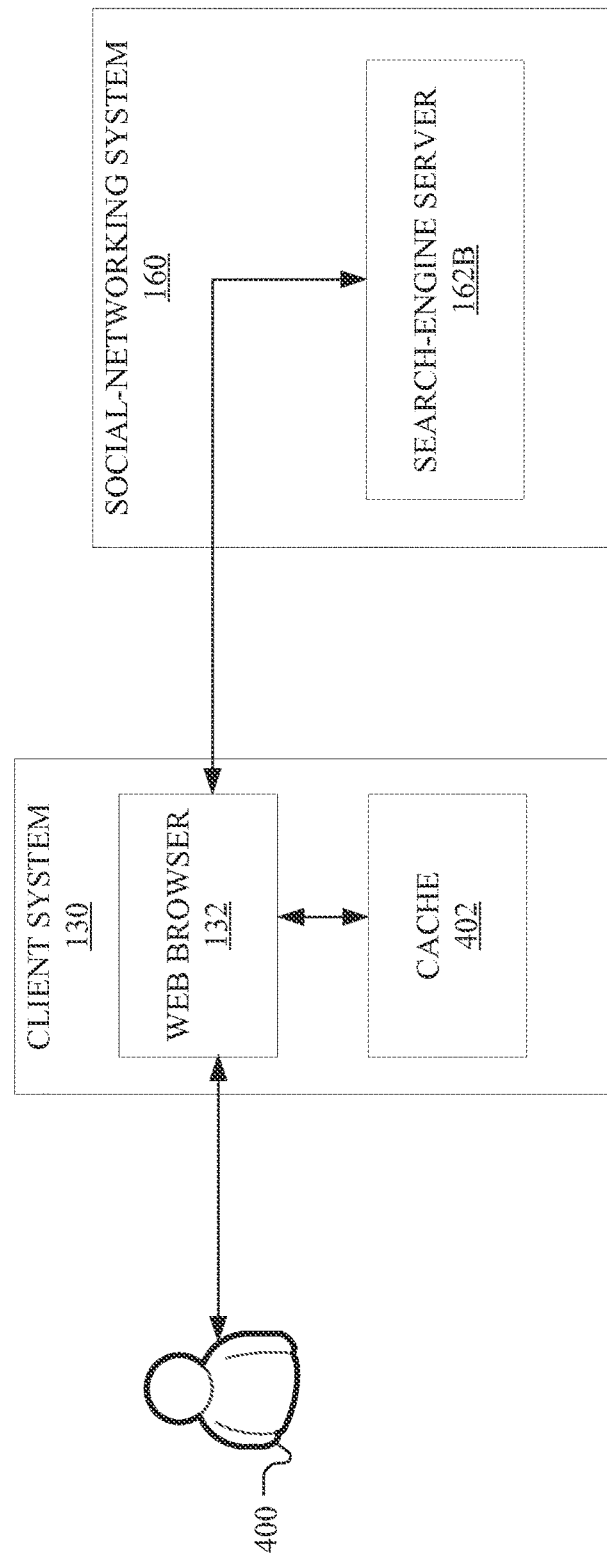
FIG. 4B illustrates the network environment for presenting search results.

FIG. 4B illustrates an example network environment for presenting search results. In the example of FIG. 4B, the example network environment may be part of network environment 100 of FIG. 1. As such, in response to receiving a selection of the suggested queries from user 400, client system 130 may access cache 402 to determine whether one or more search results corresponding to the selected suggested query is located in cache 402. If a hit to cache 402 occurs (i.e. search results corresponding to the selected suggested query is located in cache 402), client system 130 may retrieve the cached search results from cache 402 for display to user 400 substantially instantaneously. In particular embodiments, if the user does not select any of the suggested queries and instead completes a new query (in other words, a miss to cache 402 occurs), web browser 132 may retrieve from search-engine server 162B of social-networking system 160 one or more search results as generated that correspond to the new query (e.g., by transmitting the new query to social-networking system 160, where search-engine server 162B may generate new search results, which are then transmitted to the client device 130 of the querying user). In particular embodiments, the retrieved search results may be displayed on a search-results page of a native application associated with the online social network or a webpage of the online social network accessed by a web browser 132. In particular embodiments, the retrieved search results may be displayed on a search-results page of a webpage of the online social network currently accessed by web browser 132.

Although the disclosure describes and illustrates particular components, devices, or systems carrying out particular steps of presenting search results, this disclosure contemplates any suitable combination of any suitable components, devices, or systems carrying out any suitable steps of presenting search results in any suitable manner or order, including any suitable steps, which may include all, some, or none of the steps of FIG. 4B. As an example and not by way of limitation, in response to receiving a selection of the suggested queries from user 400, client system 130 may access a cache associated with social-networking system 160 (i.e., a server-side cache) to determine whether one or more search results corresponding to the selected suggested query is located in the cache. If a hit to the cache occurs (i.e. search results corresponding to the selected suggested query is located in the cache associated with social-networking system 160), client system 130 may retrieve the cached search results from the cache for display to user 400 more quickly than if the search results needed to be first generated by search-engine server 162B.

FIG. 5A illustrates an example page comprising a plurality of suggested queries associated with a first partial query input. In the example page (herein, known as page 502) of FIG. 5A, the first partial query input may correspond to "stanford" as entered by a user of the online social network. In particular embodiments, page 502 may be accessed by web browser 132 of client system 130. In the example of FIG. 5A, in response to the user entering the partial query input comprising a first character string "stanford" in query field 550, client system 130 may send the partial query input to social-networking system 160. In particular embodiments, in response to the receipt of the partial query input "stanford," typeahead server 162A of social-networking system 160 may utilize the "typeahead" feature to search data store 164 (or, in particular, a social-graph database) to identify one or more objects of social graph 200 that substantially match the unstructured search query of "stanford." As such, typeahead server 162A may identify a plurality of predicted queries that substantially match the partial query input "stanford," as described above. Furthermore, typeahead server 162A may score each of the predicted queries and prime those predicted queries whose scores are above a pre-determined threshold value, as described above. As an example and not by way of limitation, referencing FIG. 5A, typeahead server 162A may prime predicted queries associated with user node 202 corresponding to "Stanford Brown" and concept nodes 204 corresponding to "Stanford University", "Lucile Packard Children's Hospital Stanford", "Stanford, Calif.", and "Stanford Shopping Center."

In particular embodiments, as described above, social-networking system 160 may send one or more of the predicted queries as suggested queries to client system 130 for display in drop-down 504. As an example and not by way of limitation, referencing FIG. 5A, drop-down menu 500 may display a plurality of suggested queries comprising "Stanford University", "Lucile Packard Children's Hospital Stanford", "Stanford, Calif.", "Stanford Shopping Center", and "Stanford Brown." In particular embodiments, referencing FIG. 5A, in addition to the suggested queries as described earlier, client device 130 may display default queries corresponding to "Find all places named 'stanford'" and "Find all people named 'stanford'." In particular embodiments, search-engine server 162B may send to client system 130 one or more of the search results associated at least with the plurality of suggested queries for storage in a cache (for example, cache 402) of client system 130. In particular embodiments, the search results may be stored in the cache even before user completes typing the query input. As such, if the user were to select one of the suggested queries, client system 130 may access cache 402 to determine whether the search results corresponding to the selected suggested was cached. If the cached search results are located, client system 130 may retrieve the cached search results associated with the selected suggested query for display to the user. Although the disclosure describes and illustrates particular components, devices, or systems carrying out particular steps of presenting a plurality of particular suggested queries in response to particular partial query input, this disclosure contemplates any suitable combination of any suitable components, devices, or systems carrying out any suitable steps of presenting a plurality of any suitable suggested queries in response to any suitable query input in any suitable manner or order, including any suitable steps, which may include all, some, or none of the steps of FIG. 5A.

FIG. 5B illustrates an example page comprising a plurality of updated suggested queries associated with a second partial query input. In the example of FIG. 5B, the example page may correspond to page 502 of FIG. 5A and the second partial query input may correspond to "stanford u" as entered by the user of the online social network. Furthermore, the second partial query input "stanford u" includes a new character string "u" as entered by the user in query field 550. In response to the new partial query input, social-networking system 160 may prime at least four new predicted queries corresponding to "Cantor Arts Center at Stanford University", "Stanford University Medical Center", "Stanford University Press", and "Stanford University, Stanford, Calif." Furthermore, the scores of the four new primed predicted queries may be higher than the scores of the previous suggested queries (of FIG. 5A) corresponding to "Lucile Packard Children's Hospital Stanford", "Stanford, Calif.", "Stanford Shopping Center", and "Stanford Brown." As such, social-networking system 160 may send one or more of the search results corresponding to the four new primed predicted queries for storage in cache 402 of client system 130 and send the four new primed predicted queries to client system 130 for display to the user as new suggested queries. In response to receipt of the four new primed predicted queries from social-networking system 160, client system 130 may populate and update drop-down menu 500 with the four new suggested queries, in addition to the default queries corresponding to "Find all places named 'stanford'" and "Find all people named 'stanford',", as shown in the example of FIG. 5B. Although the disclosure describes and illustrates particular components, devices, or systems carrying out particular steps of presenting a plurality of particular suggested queries in response to particular partial query input, this disclosure contemplates any suitable combination of any suitable components, devices, or systems carrying out any suitable steps of presenting a plurality of any suitable suggested queries in response to any suitable partial query input in any suitable manner or order, including any suitable steps, which may include all, some, or none of the steps of FIG. 5B.

FIG. 5C illustrates an example page comprising a plurality of new suggested queries associated with an example completed query input. In the example of FIG. 5C, the example page may correspond to page 502 of FIG. 5A and the completed query input may correspond to "stanford university" as entered by the user in query field 550. Furthermore, the completed query input "stanford uinversity" includes a new character string "niversity" as entered by the user. In contrast to the example of FIG. 5B, social-networking system 160 may prime fewer predicted queries corresponding to new objects from social graph 200 that substantially match the completed query input. In particular embodiments, the suggested queries in drop-down menu 500 may remain relatively unchanged. As an example and not by way of limitation, referencing FIG. 5C, social-networking system 160 may not prime new predicted queries as the new predicted queries may be not suitable for priming (i.e. calculated scores of these new predicted queries may not be better than the scores of particular suggested queries of FIG. 5B such as for example, suggested queries corresponding to "Stanford University", "Cantor Arts Center at Stanford University", "Stanford University Medical Center", "Stanford University Press", and "Stanford University, Stanford, Calif."). Besides auto-populating drop-down menu 500 with default queries corresponding to "Find all places named 'stanford university'" and "Find all people named 'stanford university'", drop-down 504 may not be updated with addition new suggested queries. Although the disclosure describes and illustrates particular components, devices, or systems carrying out particular steps of presenting a plurality of particular suggested queries in response to particular completed query input, this disclosure contemplates any suitable combination of any suitable components, devices, or systems carrying out any suitable steps of presenting a plurality of any suitable suggested queries in response to any suitable completed query input in any suitable manner or order, including any suitable steps, which may include all, some, or none of the steps of FIG. 5C.

Figure 6:
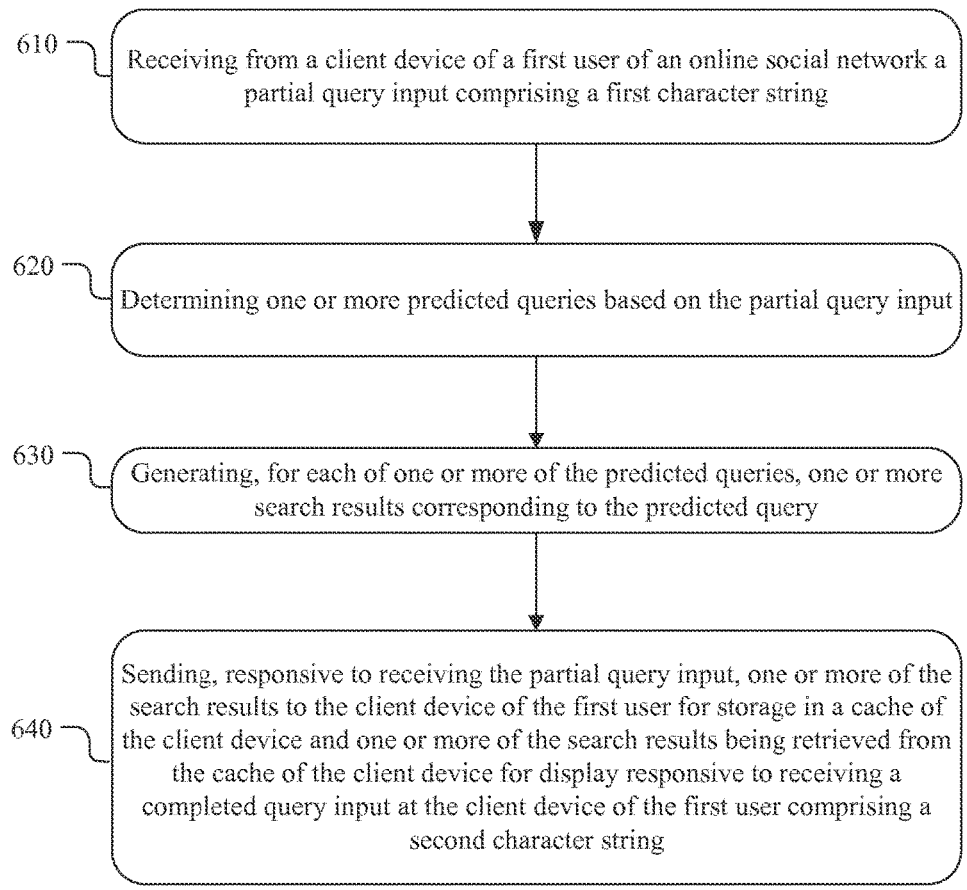
FIG. 6 illustrates an example method for priming and presenting search results.

FIG. 6 illustrates method 600 for priming and present search results. Method 600 may begin at step 610, where social-networking system 160 may receive from client system 130 (i.e. client device) of a first user of an online social network associated with social-networking system 160 a partial query input comprising a first character string. In particular embodiments, the partial query input may be entered by the first user in query field 550 of page 500 associated with web browser 132 of client system 130. At step 620, social-networking system 160 may determine one or more predicted queries based on the partial query input. In particular embodiments, social-networking system 160 may access a social graph 200 comprising a plurality of nodes and a plurality of edges 206 connecting the nodes. Each of the edges between the two nodes may represent a single degree of separation between them. The nodes may comprise a first user node 202 corresponding to the first user associated with the online social network and a plurality of second nodes (one or more user nodes 202, concepts nodes 204, or any combination thereof) that each may correspond to a concept or a second user associated with the online social network, as described above. In particular embodiments, at least one of the predicted queries is a structured query comprising references to one or more nodes and one or more edges 206, as described above. At step 630, social-networking system 160 may generate one or more search results for each of the predicted queries. In particular embodiments, social-networking system 160 may calculate a score for each of the predicted queries based at least in part on the partial query input. In particular embodiments, the calculated score for each of the predicted queries is based on a ranking determined by a typeahead process, where the typeahead process identifies one or more matches between one or more n-grams of the partial query input and one or more objects associated with social graph 200, as described above. In particular embodiments, the calculated score for each of the predicted queries is based on a query type of the partial query input, as described above. In particular embodiments, the calculated score for each of the predicted queries is based on a page of the online social network currently accessed by the first user, as described above. In particular embodiments, the calculated score for each of the predicted queries is based on a number of characters in the partial query input, as described above. In particular embodiments, the calculated score for each of the predicted queries is further based on a social-graph affinity associated with the first user with respect to one or more objects associated with the predicted query, as described above.

In particular embodiments, social-networking system 160 may determine whether to execute each of the predicted queries based at least in part on the calculated score of the predicted query, as described above. In particular embodiments, social-networking system 160 may search social graph 200 to identify one or more objects corresponding to one or more nodes, respectively, of the plurality of nodes that substantially match each of the predicted queries, as described above. In particular embodiments, each of the search results may comprise references to one or more of the identified objects, as described above. At step 640, social-networking system 160 may send one or more of the search results to client system 130 of the first user for storage in cache 402 of client system 130, as described above. Alternatively, social-networking system 160 may send one or more of the search results to a cache associated with social-networking system 160 (i.e., a server-side cache).

In particular embodiments, a completed query input from the first user may be received by client system 130. The completed query input may comprise a second character string, where the second character string includes at least the first query string of the partial query input. In particular embodiments, in response to receiving the completed query input from client system 130, social-networking system 160 may send one or more suggested queries to client system 130 of the first user for display, where each suggested query corresponding to one of the one or more predicted queries generated in response to the partial query input. In particular embodiments, in response to receiving the suggested queries from social-networking system 160, client system 130 may receive from the first user a selection of one of the suggested queries.

Furthermore, in response to receiving the completed query input at client system 130, client system 130 may retrieve one or more of the search results from cache 402 of client system 130 for display to first user. In particular embodiments, client system 130 may retrieve one or more of the search results stored in cache 402 of client system 130, where the retrieved search results correspond to the suggested query as selected by the first user, as described above. Alternatively, in response to receiving the completed query input at client system 130, client system 130 may retrieve one or more of the search results from a cache associated with social-networking system 160 (i.e., a server-side cache) for display to first user. In particular embodiments, client system 130 may retrieve one or more of the search results stored in the cache associated with social-networking system 160, where the retrieved search results correspond to the suggested query as selected by the first user, as described above. Although this disclosure describes and illustrates particular steps of method 600 of FIG. 6 as occurring in a particular order, this disclosure contemplates any suitable steps of method 600 of FIG. 6 occurring in any suitable order. Moreover, although this disclosure describes and illustrates an example method for priming and presenting search results associated with an online social network including the particular steps of method 600 of FIG. 6, this disclosure contemplates any suitable method for priming and present any suitable search results associated with any suitable online social network including any suitable steps, which may include all, some, or none of the steps of method 600 of FIG. 6, where appropriate. Furthermore, although this disclosure describes and illustrates particular components, devices, or systems carrying out particular steps of method 600 of FIG. 6, this disclosure contemplates any suitable combination of any suitable components, devices, or systems carrying out any suitable steps of method 600 of FIG. 6.

Although this disclosure discusses using priming requests in the search query context, priming requests may be used in any suitable context. In particular embodiments, a user of an online social network may request information relating to a specific subject matter (e.g., users, concepts, external content or resource) by initiating a trigger action on the online social network. Social-networking system 160 may identify resources or content (e.g., user-profile pages, content-profile pages, or external resources) that are most likely to be related to the trigger action. The trigger action may comprise a post, a comment, a newsfeed action, a check-in, a login, a like, share, or any other suitable user's action associated with the online social network. In response to the user initiating (but not yet completing) a trigger action, social-networking system 160 may pre-generate content in anticipation of the user completing the trigger action. In particular embodiments, the pre-generated content may be modified in response to one or more texts entered in association with the trigger action such as for example, posting a message on the online social network. As an example and not by way of limitation, if a user is checking-in to a location via the user's client system 130 using a native application associated with the online social network, one or more of the frontend-typeahead process and the backend-typeahead process may implement and utilize the typeahead processes (as described above) that may automatically identify social-graph elements relevant to the user, the trigger action, and the texts currently being entered by the user. As the user enters the texts in association with the trigger action, the backend-typeahead process may attempt to match the string of textual characters being entered in the declaration to strings of characters (e.g., names, descriptions) corresponding to user, concepts, or edges and their corresponding elements in the social graph 200. In particular embodiments, when a match or matches are found, the backend-typeahead process may automatically populate the pre-generated content references to the identified social-graph elements (such as, for example, the node name/type, node ID, edge name/type, edge ID, or another suitable reference or identifier) of social graph 200. Thereafter, social-networking system 160 may prime the pre-generated content (e.g., a reaction card generated in response to the check-in, or a newsfeed content in response to a login) associated with the trigger action, for example, by storing it in a cache associate with the client system 130 or social-networking system 160. Once the user completes the trigger action (e.g., selects the "Post", "Check-in", or "Login" button), client system 130 may retrieve the pre-generate content generated in anticipation of the trigger action from the appropriate cache (either client-side or server-side). In connection with reaction cards, particular embodiments may utilize one or more systems, components, elements, functions, methods, operations, or steps disclosed in U.S. patent application Ser. No. 14/466,269, filed 22 Aug. 2014, which is incorporated by reference. Although this disclosure describes applying priming requests to particular trigger actions in a particular manner, this disclosure contemplates applying priming requests to any suitable trigger actions in any suitable manner.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action (or may be used as an input to calculate such a probability). In this way, a user's future actions may be predicted based on the user's prior actions, where the coefficient may be calculated at least in part on a history of the user's actions. This predicted probability represented by the coefficient may be different than the probabilities used to score search queries or reaction-cards discussed previously, may be used as a factor in calculating those probabilities, or may be directly used for those probabilities, as appropriate. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user. In particular embodiments, the coefficient of a user towards one or more objects may be based on the geographic proximity of the objects (e.g., to the user and/or each other) and the user's interactions with the objects. As an example and not by way of limitation, a pair of geo-locations that are sequentially visited by the user, such as for example, a restaurant and a nearby movie theater may be considered to be of more interest to each other than unrelated geo-locations.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 7:
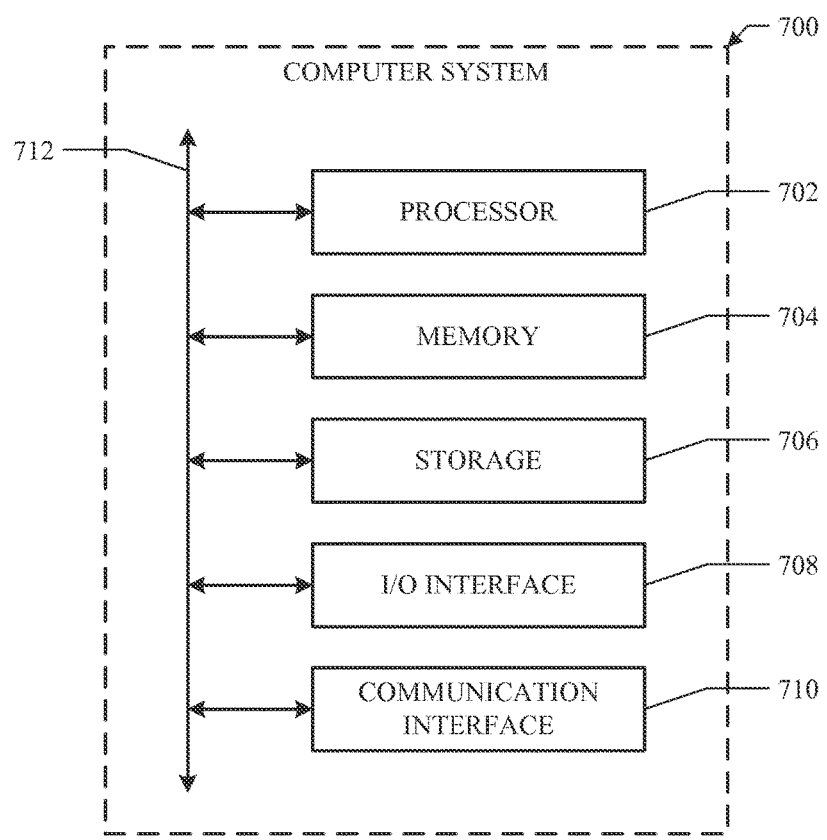
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a social-networking system of an online social network:
   receiving, at the social-networking system from a client device of a first user of the online social network, a partial query input comprising a first character string;
   determining, by the social-networking system, one or more predicted queries based on the partial query input;
   calculating, by the social-networking system, a score for each of the predicted queries based at least in part on the partial query input, wherein the score indicates a probability the user will input the respective predicted query;
   determining, by the social-networking system, whether to execute each of the predicted queries based at least in part on the calculated score of the predicted query;
   generating, by a search-engine server of the social-networking system, for each predicted query determined to be executed, a set of search results corresponding to the predicted query; and
   sending, by the search-engine server of the social-networking system, responsive to receiving the partial query input, the set of search results corresponding to each predicted query determined to be executed to the client device of the first user for storage in a cache of the client device, each set of search results remaining stored without display in the cache of the client device until receipt of a completed query input at the client device, each set of search results being operable to be retrieved from the cache of the client device for display responsive to receiving a completed query input at the client device of the first user comprising a second character string, wherein the second character string comprises at least the first character string, the completed query input matching at least one of the predicted queries, the set of search results retrieved from the cache of the client device for display corresponding to the predicted query matching the completed query input.

2. The method of claim 1, further comprising:
   receiving, at the client device of the first user, the completed query input; and
   retrieving, at the client device of the first user, responsive to receiving the completed query input, the set of search results stored in the cache of the client device, the retrieved set of search results corresponding to the at least one predicted query matching the completed query input.

3. The method of claim 1, further comprising sending, responsive to receiving the completed query input, one or more suggested queries to the client device of the first user for display, each suggested query corresponding to one of the one or more predicted queries.

4. The method of claim 3, further comprising:
receiving, at the client device of the first user, a selection of one of the suggested queries; and
retrieving, at the client device of the first user, responsive to receiving the selected suggested query, the set of search results stored in the cache of the client device, the retrieved set of search results corresponding to the selected suggested query.

5. The method of claim 1, further comprising:
receiving, from the client device of the first user, the completed query input, wherein the completed query input does not match at least one of the predicted queries;
generating, for the completed query input, one or more search results corresponding to the completed query input; and
sending, responsive to receiving the completed query input, one or more of the search results to the client device for display to the first user.

6. The method of claim 1, further comprising:
accessing a social graph comprising a plurality of nodes and a plurality of edges connecting the nodes, each of the edges between two of the nodes representing a single degree of separation between them, the nodes comprising:
a first node corresponding to a first user associated with an online social network; and
a plurality of second nodes that each correspond to a concept or a second user associated with the online social network.

7. The method of claim 6, wherein at least one of the predicted queries is a structured query comprising references to one or more nodes and one or more edges.

8. The method of claim 6, wherein generating the set of search results corresponding to the predicted queries comprises searching the social graph to identify one or more objects corresponding to one or more nodes, respectively, of the plurality of nodes that match each of the predicted queries.

9. The method of claim 8, wherein each of the search results comprises references to one or more of the identified objects.

10. The method of claim 1, wherein the score for each of the predicted queries is based on a ranking determined by a typeahead process, wherein the typeahead process identifies one or more matches between one or more n-grams of the partial query input and one or more objects associated with the online social network.

11. The method of claim 1, wherein the score for each of the predicted queries is based on a query type of the partial query input.

12. The method of claim 1, wherein the score for each of the predicted queries is based on a page of the online social network currently accessed by the first user.

13. The method of claim 1, wherein the score for each of the predicted queries is based on a number of characters in the partial query input.

14. The method of claim 1, wherein the score for each of the predicted queries is further based on a social-graph affinity associated with the first user with respect to one or more objects associated with the predicted query.

15. The method of claim 1, wherein the retrieved search results are displayed on a search-results page of a native application associated with the online social network.

16. The method of claim 1, wherein the retrieved search results are displayed on a search-results page of a webpage of the online social network accessed by a browser client.

17. One or more computer-readable non-transitory storage media embodying software that is operable when executed, by a social-networking system of an online social network, to:
receive, at the social-networking system from a client device of a first user of an online social network, a partial query input comprising a first character string;
determine, by the social-networking system, one or more predicted queries based on the partial query input;
calculate, by the social-networking system, a score for each of the predicted queries based at least in part on the partial query input, wherein the score indicates a probability the user will input the respective predicted query;
determine, by the social-networking system, whether to execute each of the predicted queries based at least in part on the calculated score of the predicted query;
generate, by a search-engine server of the social-networking system, for each predicted query determined to be executed, a set of search results corresponding to the predicted query; and
send, by the search-engine server of the social-networking system, responsive to receiving the partial query input, the set of search results corresponding to each predicted query determined to be executed to the client device of the first user for storage in a cache of the client device, each set of search results remaining stored without display in the cache of the client device until receipt of a completed query input at the client device, each set of search results being operable to be retrieved from the cache of the client device for display responsive to receiving a completed query input at the client device of the first user comprising a second character string, wherein the second character string comprises at least the first character string, the completed query input matching at least one of the predicted queries, the set of search results retrieved from the cache of the client device for display corresponding to the predicted query matching the completed query input.

18. A social-networking system of an online social network comprising: one or more processors; and a memory coupled to the processors comprising instructions executable by the processors, the processors operable when executing the instructions to:
receive, at the social-networking system from a client device of a first user of an online social network, a partial query input comprising a first character string;
determine, by the social-networking system, one or more predicted queries based on the partial query input;
calculate, by the social-networking system, a score for each of the predicted queries based at least in part on the partial query input, wherein the score indicates a probability the user will input the respective predicted query;
determine, by the social-networking system, whether to execute each of the predicted queries based at least in part on the calculated score of the predicted query;
generate, by a search-engine server of the social-networking system, for each predicted query determined to be executed, a set of search results corresponding to the predicted query; and send, by the search-engine server of the social-networking system, responsive to receiving the partial query input, the set of search results corresponding to each predicted query determined to be executed to the client device of the first user for storage in a cache of the client device, each set of search results remaining stored without display in the cache of the client device until receipt of a completed query input at the client device, each set of search results being operable to be retrieved from the cache of the client device for display responsive to receiving a completed query input at the client device of the first user comprising a second character string, wherein the second character string comprises at least the first character string, the completed query input matching at least one of the predicted queries, the set of search results retrieved from the cache of the client device for display corresponding to the predicted query matching the completed query input.

19. The system of claim 18, wherein the processors are further operable when executing the instructions to:
receive, at the client device of the first user, the completed query input; and
retrieve, at the client device of the first user, responsive to receiving the completed query input, the set of search results stored in the cache of the client device, the retrieved set of search results corresponding to the at least one predicted query matching the completed query input.

20. The system of claim 18, wherein the processors are further operable when executing the instructions to:
send, responsive to receiving the completed query input, one or more suggested queries to the client device of the first user for display, each suggested query corresponding to one of the one or more predicted queries.

21. The system of claim 20, wherein the processors are further operable when executing the instructions to:
receive, at the client device of the first user, a selection of one of the suggested queries; and
retrieve, at the client device of the first user, responsive to receiving the selected suggested query, the set of search results stored in the cache of the client device, the retrieved set of search results corresponding to the selected suggested query.

22. The system of claim 18, wherein the processors are further operable when executing the instructions to:
receive, from the client device of the first user, the completed query input, wherein the completed query input does not match at least one of the predicted queries;
generate, for the completed query input, one or more search results corresponding to the completed query input; and
send, responsive to receiving the completed query input, one or more of the search results to the client device for display to the first user.

23. The system of claim 18, wherein the processors are further operable when executing the instructions to:
access a social graph comprising a plurality of nodes and a plurality of edges connecting the nodes, each of the edges between two of the nodes representing a single degree of separation between them, the nodes comprising:
a first node corresponding to a first user associated with an online social network; and
a plurality of second nodes that each correspond to a concept or a second user associated with the online social network.

24. The system of claim 23, wherein at least one of the predicted queries is a structured query comprising references to one or more nodes and one or more edges.

25. The system of claim 23, wherein the instructions to generate the set of search results corresponding to the predicted queries comprises instructions to search the social graph to identify one or more objects corresponding to one or more nodes, respectively, of the plurality of nodes that match each of the predicted queries.

26. The system of claim 25, wherein each of the search results comprises references to one or more of the identified objects.

27. The system of claim 18, wherein the score for each of the predicted queries is based on a ranking determined by a typeahead process, wherein the typeahead process identifies one or more matches between one or more n-grams of the partial query input and one or more objects associated with the online social network.

28. The system of claim 18, wherein the score for each of the predicted queries is based on a query type of the partial query input.

29. The system of claim 18, wherein the score for each of the predicted queries is based on a page of the online social network currently accessed by the first user.

30. The system of claim 18, wherein the score for each of the predicted queries is based on a number of characters in the partial query input.

31. The system of claim 18, wherein the score for each of the predicted queries is further based on a social-graph affinity associated with the first user with respect to one or more objects associated with the predicted query.

32. The system of claim 18, wherein the retrieved search results are displayed on a search-results page of a native application associated with the online social network.

33. The system of claim 18, wherein the retrieved search results are displayed on a search-results page of a webpage of the online social network accessed by a browser client.

* * * * *